United States Patent
Sidwell et al.

(10) Patent No.: US 7,021,892 B2
(45) Date of Patent: Apr. 4, 2006

(54) METHOD FOR ASSEMBLING GAS TURBINE ENGINE COMPONENTS

(75) Inventors: Carroll V. Sidwell, Wethersfield, CT (US); David L. Darmofal, Medfield, MA (US)

(73) Assignees: Massachusetts Institute of Technology, Cambridge, MA (US); United Technologies Corporation, East Hartford, CT (US)

(*) Notice: Subject to any disclaimer, the term of this patent is extended or adjusted under 35 U.S.C. 154(b) by 35 days.

(21) Appl. No.: 10/717,408

(22) Filed: Nov. 19, 2003

(65) Prior Publication Data

US 2005/0111975 A1    May 26, 2005

(51) Int. Cl.
*F01D 5/18* (2006.01)

(52) U.S. Cl. ............... 415/115; 416/97 R; 29/889.2

(58) Field of Classification Search ............... 415/115; 416/97 R, 92, 96 A; 29/889.2
See application file for complete search history.

(56) References Cited

U.S. PATENT DOCUMENTS

| 5,536,143 A | * | 7/1996 | Jacala et al. ............... 416/96 R |
| 6,247,896 B1 | * | 6/2001 | Auxier et al. ............... 416/97 R |
| 6,408,610 B1 | * | 6/2002 | Caldwell et al. ............ 29/889.2 |

\* cited by examiner

*Primary Examiner*—Edward K. Look
*Assistant Examiner*—Igor Kershteyn
(74) *Attorney, Agent, or Firm*—Choate, Hall & Stewart LLP

(57) ABSTRACT

Method for assembling into turbine sets turbine components having internal cooling passages. The turbine components are classified according to flow capability through the internal cooling passages and turbine sets are assembled in which the turbine components have the same flow capability classification.

20 Claims, 5 Drawing Sheets

METHOD FOR ASSEMBLING GAS TURBINE ENGINE COMPONENTS

BACKGROUND OF THE INVENTION

This invention relates to a method for assembling gas turbine engine components and more particularly to assembling turbine sets to increase the usable life of a row of cooled turbine airfoils.

As is well known, gas turbine engines include multiple rows of airfoils and the failure of any single airfoil in a row constitutes a failure of the engine. These airfoils operate in a very harsh temperature environment and the individual airfoil temperatures are controlled by passing relatively cooler air through internal passages in the airfoil and/or applying a thin film of cool air on the external surface of the airfoil. Those skilled in the art will appreciate that the life of an individual airfoil is a function of its temperature history. In general, more cooling flow leads to lower temperatures which in turn leads to higher turbine blade or vane life. Conversely, lower life airfoils typically pass less coolant flow relative to other airfoils in a row. It is therefore desirable to increase the flow through such low-life airfoils while at the same time not adversely affecting the other airfoils in the same row.

The cooling airflow through each individual blade or vane is driven by a pressure ratio across the element. The pressure ratio represents the ratio between the blade supply pressure and the dump pressure. The supply pressure is the pressure just upstream of the entrance to the cooling passages on the bottom of the blade and the dump pressure is the gaspath pressure on the outside of the blade. The physical features of each blade determine the relationship between mass flow through the blade and the pressure ratio across the blade. This relationship of mass flow through the blade and the pressure ratio across the blade is referred to as the "characteristic curve" of the blade.

As with all manufacturing operations, cooled turbine blades are subject to manufacturing variation. This variation comes from a variety of sources such as casting and film hole geometric variability. As a result, each manufactured turbine blade exhibits a slightly different relationship between mass flow and pressure ratio. That is, for a given mass flow of cooling air, each individual turbine blade would operate at a different pressure ratio. Conversely, for a given pressure ratio, each individual blade will have a different mass flow. There is an acceptable tolerance during manufacturing on this pressure ratio and blades that demonstrate pressure ratios above or below set limits are unacceptable. In general, acceptable blades span the range between the low and high pressure ratio limits. High pressure ratio and low pressure ratio blades are often referred to as low-flow and high-flow blades, respectively.

A primary object of the present invention is a method of selecting blades for assembly into turbine rows that can increase the mass flow to low-flow blades thereby increasing the life of the blade row relative to current turbine row assembly practice. Furthermore, the present invention has applications to a wide variety of components in a gas turbine engine in which multiple, supposedly-nominal components with flow passages are assembled in parallel.

SUMMARY OF THE INVENTION

In a first aspect, the invention is a method for assembling into sets gas turbine engine components having flow passages. The method includes classifying the flow capability through the flow passages of each one of a plurality of the engine components and assembling into sets engine components having the same flow capability classification. In a preferred embodiment, the engine components are turbine blades and turbine vanes. In this embodiment the flow classification may include a high-flow class and a low-flow class and potentially includes more than two flow classes ranging from a low-flow class to a high-flow class. As a minimum, two classes are suitable, but any larger number of classes are suitable. The engine components, for example, may be rotor blades of the first-stage of a high-pressure turbine and the resulting sets would be assembled in the first-stage turbine rotor disk. The flow classification may include classes that are subsets of acceptable flow limits (by current standards) for turbine airfoils. However, in one embodiment of this invention, the method of assembly would permit ranges of flow capability that are larger than can be achieved with a random selection assembly process.

If a turbine row is assembled exclusively from one of the classes (the low-flow blade class, for example) according to the present invention then, in accordance with the average flow characteristics of all the blades in the row, the pressure ratio across all the blades will increase. Since the lowest flowing blade in the row is subject to this increased pressure ratio, it will pass more flow than if it were assembled with a randomly drawn set of blades. Thus, if turbine blades are classified and assembled into turbine sets based on flow classes according to the invention, the lowest flowing blade passes more flow, has lower metal temperatures, and subsequently has higher life than current assembly practice would allow.

BRIEF DESCRIPTION OF THE DRAWING

The invention is described with reference to the several figures of the drawing, in which.

DESCRIPTION OF THE PREFERRED EMBODIMENT

Most jet engines such as, for example, a modern high-bypass turbofan engine, have turbine cooling air delivery architectures whose mass flow is relatively insensitive to changes in pressures as compared to the turbine blades.

Thus, for clarity of explanation in this specification, we will assume the turbine cooling air system behaves like a constant mass flow device. When blades are assembled into a turbine row, the blades share a common upstream supply pressure and a common downstream gaspath pressure. The supply pressure is the pressure just upstream of the entrance to the cooling passages on the bottom of the blade and the dump pressure is the gaspath pressure on the outside of the blade. If each blade in a turbine row were identically nominal (impossible in practice), then the pressure ratio across the blades during operation would be the nominal pressure ratio.

Figure 1:
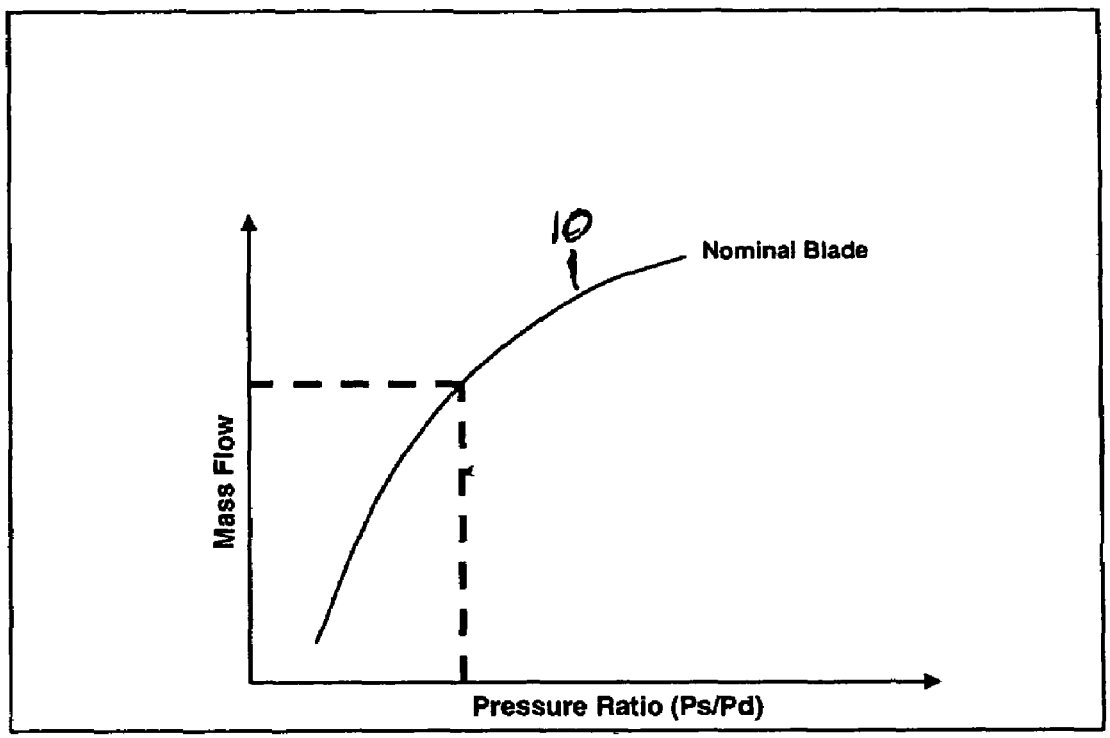
FIG. 1 is a graph of mass flow as a function of pressure ratio ($P_s/P_d$) for a nominal turbine blade.

The physical features of each blade determine the relationship between the mass flow through the blade and the pressure ratio across the blade. This relationship is referred to as the "characteristic curve" of each blade. FIG. 1 is a typical graph of mass flow versus pressure ratio for a nominal blade. In general, more mass flow corresponds to higher pressure ratio and vice-versa, so characteristic curves have positive slopes as shown by the curve 10 in FIG. 1. As shown in FIG. 1, at constant mass flow the pressure ratio is determined by the characteristic behavior of the blades.

Figure 2:
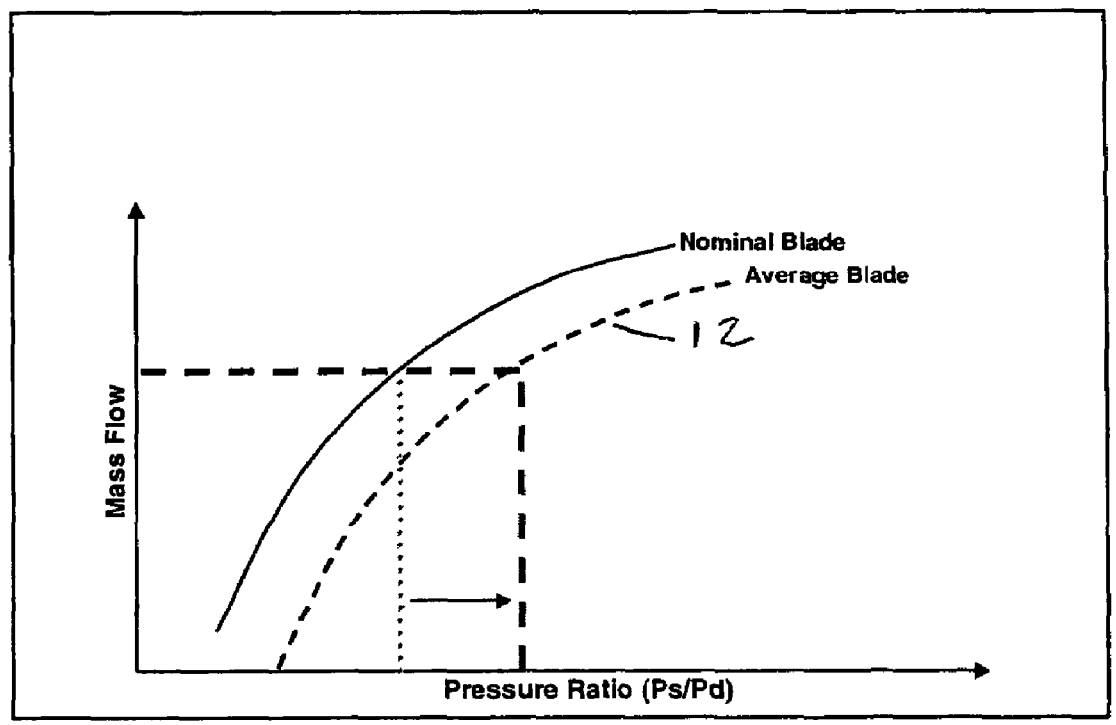
FIG. 2 is a graph of mass flow as a function of pressure ratio for a nominal blade and an average blade.
Figure 3:
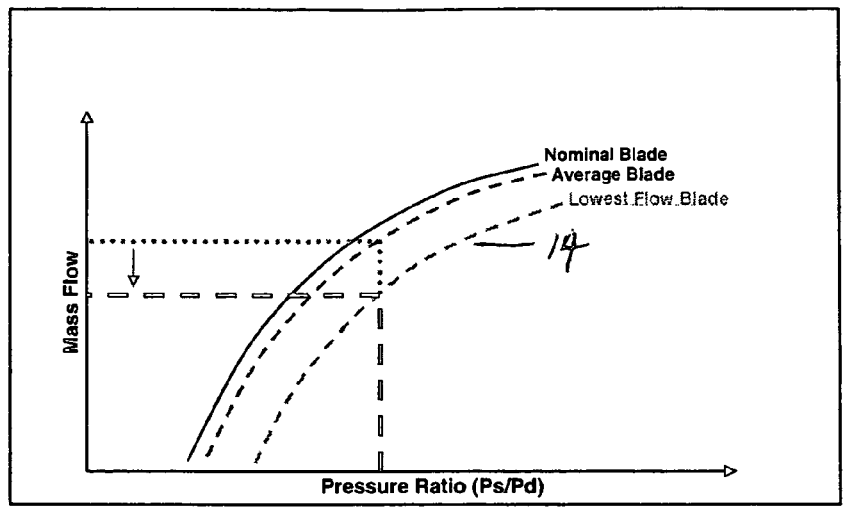
FIG. 3 is a graph of mass flow as a function of pressure ratio for a nominal blade, an average blade, and the lowest flow blade.

If a turbine set were assembled with a random set of blades whose flow capability is other than nominal, the pressure ratio across all of the blades is determined by the average characteristic curve of all the blades. As shown in FIG. 2 a dotted line 12 is an average characteristic curve and for a fixed mass flow, the average blade area sets the pressure ratio. FIG. 2 demonstrates that if the blades in a disk are on average nominal flowing, the supply pressure will be nominal. On the other hand, if blades are on average low flowing, the supply pressure will increase for a given mass flow. Each individual blade passes mass flow in accordance with its individual characteristic curve and the pressure ratio is set by the average behavior. With reference now to FIG. 3, one can see that for a particularly low flowing blade assembled into a row which is on average nominal flowing the result is a significant decrease in mass flow for the low flowing blade having a characteristic curve 14. That is, the lowest flowing blade is subject to the pressure ratio set by the average blade which leads to a much lower flow in this blade. The decrease in mass flow increases the blade's metal temperature and decreases its life.

Figure 4:
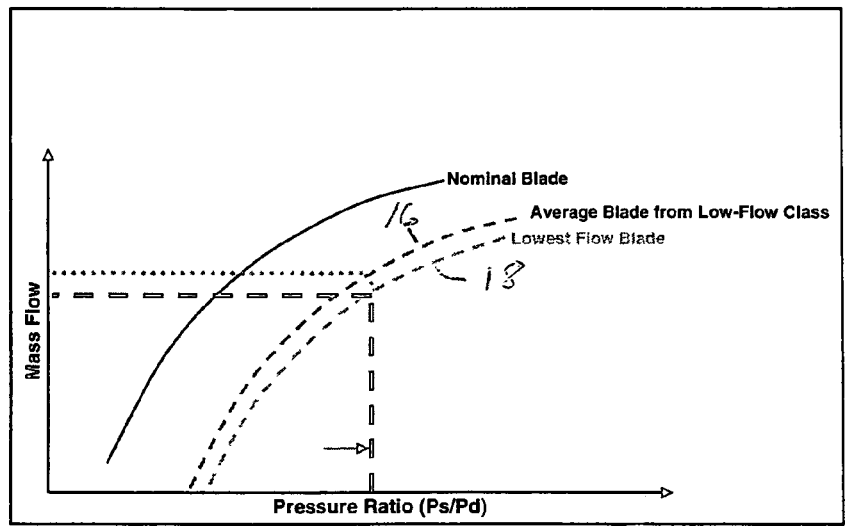
FIG. 4 is a graph of mass flow as a function of pressure ratio for a nominal blade, an average blade from a low-flow class and the lowest flow blade.

As discussed above, turbine blades, according to the invention, are classified into different levels of flow capabilities (low-flow blades and high-flow blades, for example, and preferably along with finer gradations and/or more complex classifications) during the manufacturing process. In a preferred embodiment, a turbine row is assembled exclusively from one of the classes, for example, a low-flow blade class. In accordance with the average flow characteristics of all the blades in the row in this case, the pressure ratio across all the blades will increase so as to pass the delivered amount of cooling flow. The lowest flowing blade in the row is subject to this increased pressure ratio and passes more flow than if it were assembled with a randomly drawn set of blades. In FIG. 4, the curve 16 is the characteristic curve for an average blade from a low-flow class. The average blade curve 16 sets the pressure ratio that then acts on the lowest flow blade having a characteristic curve 18. On average, all the blades are low-flowing which raises the supply pressure so that the mass flow for the lowest flow blade is closer to nominal mass flow than would otherwise be the case. In short, turbine blades that are classified and assembled into turbine sets based on flow classes will result in the lowest flowing blade passing more flow, having lower metal temperatures and subsequently having higher life than if the blade had been assembled among randomly selected blades as is the current practice.

An example calculation will now be set forth to illustrate the methodology of the present invention. This example calculation was performed on the first stage blades of a high pressure turbine. A quasi-one-dimensional network flow model was used to model the behavior of the entire auxiliary air system for a modern high-bypass turbofan engine. For a full description of this model, see, Sidwell, V. and Darmofal, D., 2003, "Probabilistic Analysis of a Turbine Cooling Air Supply System: The Effect on Airfoil Oxidation Life," ASME Paper GT2003-38119. The contents of this article are incorporated herein by reference. Within the auxiliary air system model the first stage turbine blades were represented by their characteristic curves (note that in the network flow analysis, each blade in the row is modeled by its individual characteristic curve). A heat transfer scaling law was used to update blade metal temperatures in response to changes in the quantity of internal cooling flow in each blade. Finally, material capability curves known to individual blade manufacturers are used to calculate usable blade life as a function of blade metal temperature. The blade characteristic curves for the row of interest were randomly varied in accordance with demonstrated manufacturing variability. Probabilistic analysis was performed in order to characterize the distribution of engine life, as limited by the first stage turbine blades. We note that failure of the row results from a single blade failing, so that the failure of any blade in a row constitutes an engine failure in this context.

Figure 5:
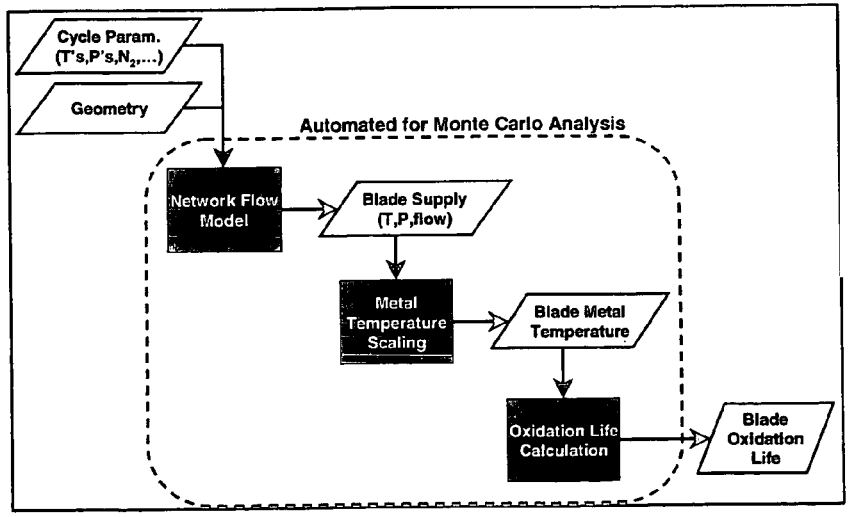
FIG. 5 is a flow chart for carrying out an example calculation.

FIG. 5 is an analysis flow chart for the example calculation. Three separate probabilistic analyses were performed for comparison:
1. a baseline analysis that is consistent with current blade selection and assembly practice for high pressure turbines ("Total Population")
2. an analysis in which blades were drawn only from a low-flow class of blades ("Class 1")
3. an analysis where blades were drawn only from a near-nominal-flow class of blades ("Class 3").

Figure 6:
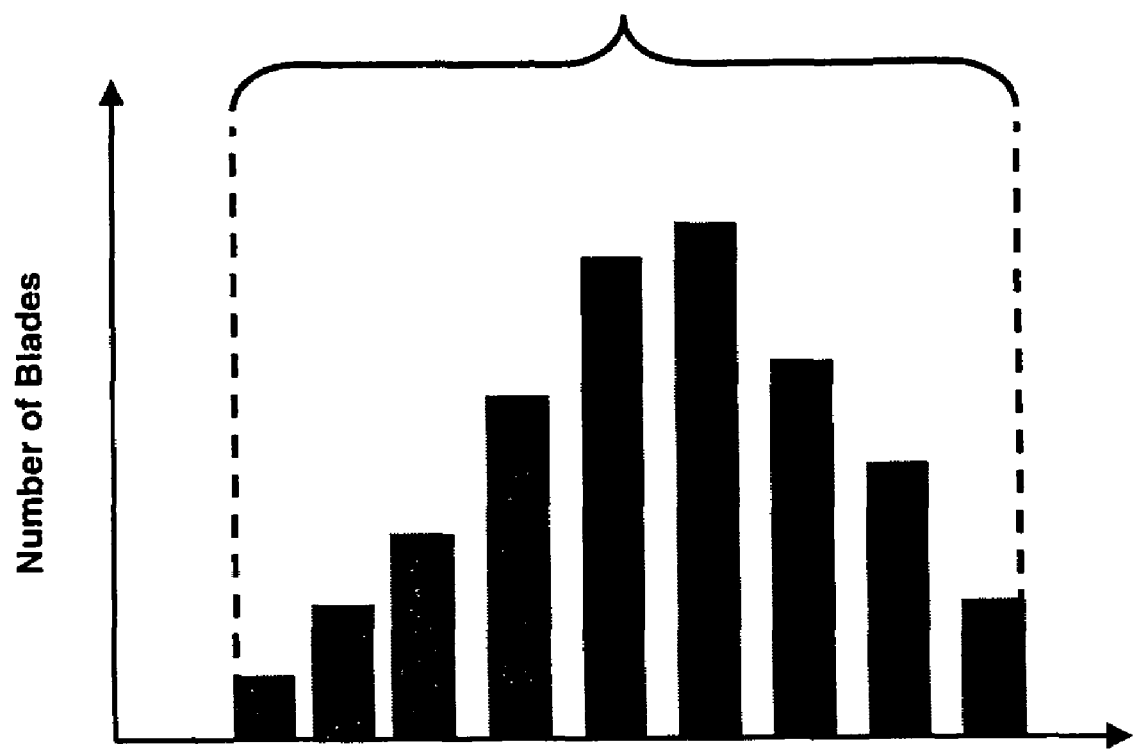
FIG. 6 is a histogram illustrating the number of blades versus production flow for an example population of production blades.
Figure 7:
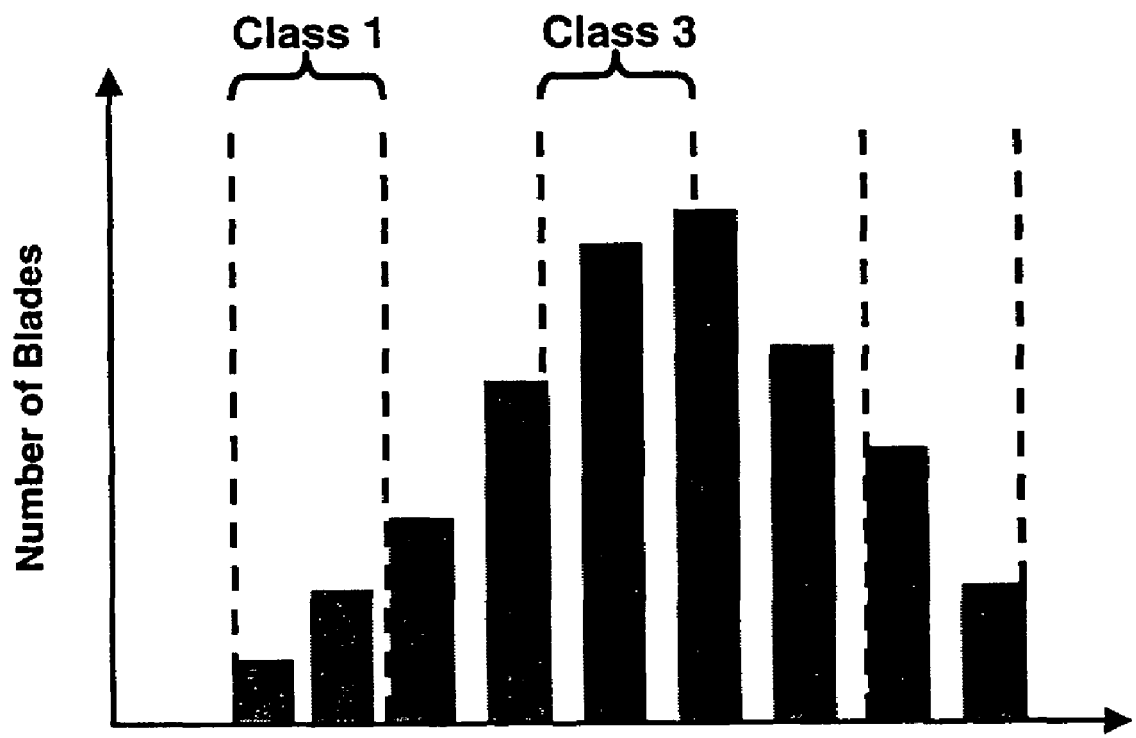
FIG. 7 is a histogram of the number of blades versus production flow including production flow classes.

As mentioned earlier, the manufacturing process results in a distribution of acceptable individual blade flows. For the baseline analysis which represents current assembly practice, blades are randomly drawn from this population to make a complete row as shown in FIG. 6. For the two classed-blade analyses, the full distribution of manufacturing variability is divided into five classes of equal blade flow. Class 1 refers to the lowest flow class and Class 3 refers to the near-nominal-flow class as shown in FIG. 7. Classes 2, 4 and 5 have been omitted to simplify the example but the results are consistent with Classes 1 and 3.

Figure 8:
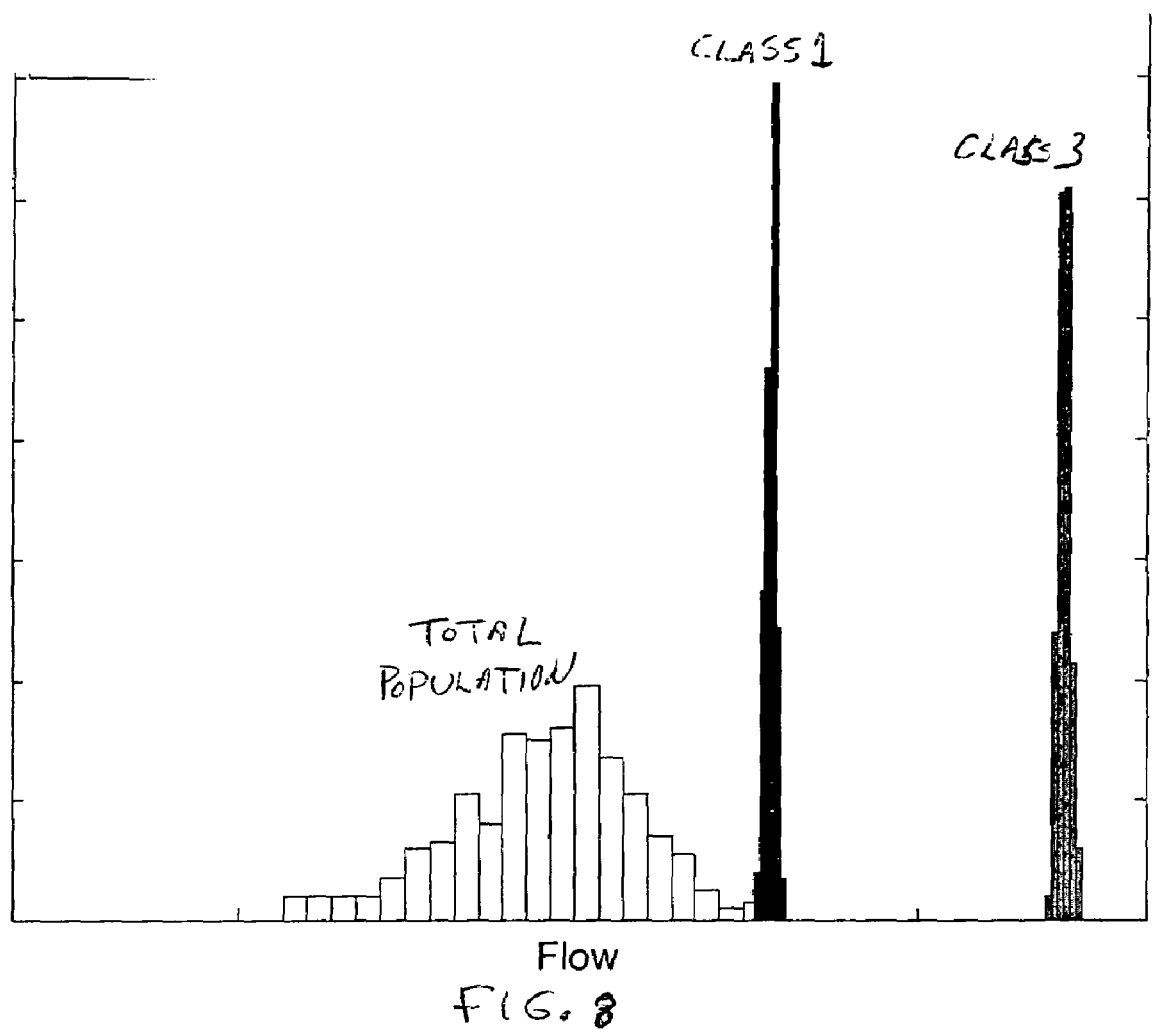
FIG. 8 is a histogram showing minimum flow through an individual blade for three example analyses.
Figure 9:
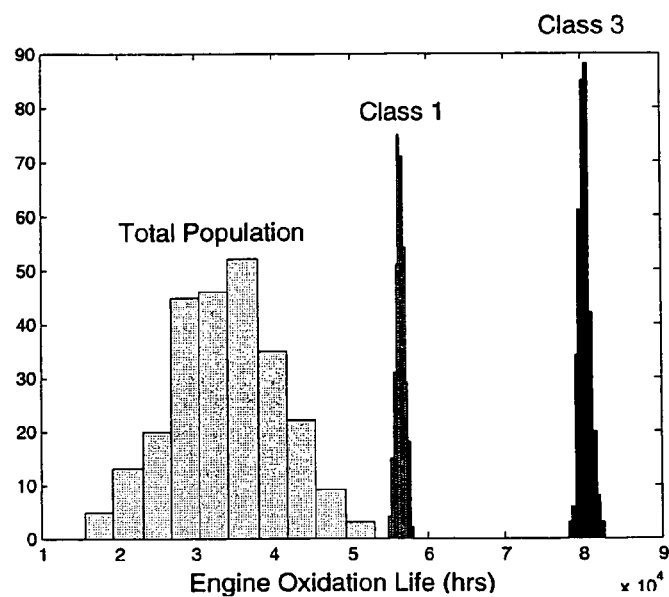
FIG. 9 is a histogram illustrating engine oxidation life.
Figure 10:
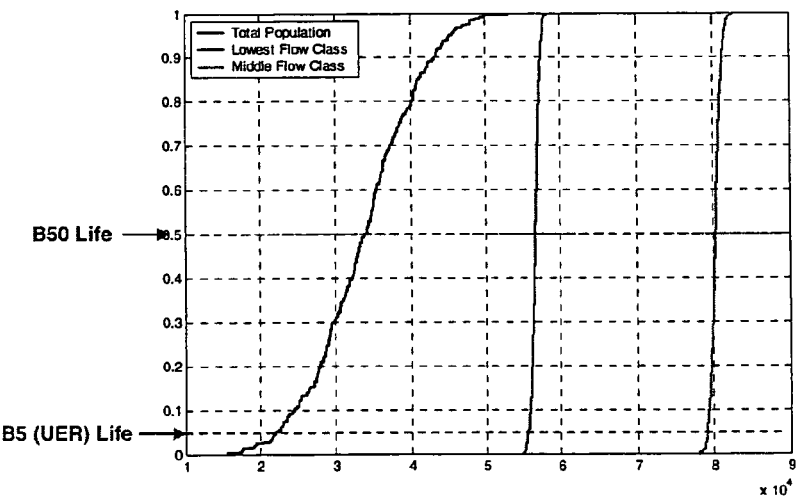
FIG. 10 is a graph illustrating empirical cumulative distribution functions of engine life.

FIG. 8 shows histograms of the minimum flow through an individual blade for the three analyses. Both Class 1 and Class 3 show a significant improvement in the minimum flow observed in a set of turbine blades. In particular, the minimum flow of the Class 1 blades is greater than the minimum flow of any of the randomly-assembled turbine blade sets (i.e. from the Total Population results). As the temperature of the blade is directly related to the mass flow through the blade, and the life of a blade is directly related to the blade metal temperature, this improvement in minimum flow implies an improvement in the life of a set of turbine blades. To demonstrate this, FIG. 9 shows histograms of engine life for the three analyses. Both Class 1 and Class 3 show significant improvement in engine life as compared to the Total Population. FIG. 10 shows the empirical cumulative distribution functions of engine life for the three probabilistic analyses. The B5 life (5 out of 100 probability) is of particular interest for turbine blades. Class 1, the lowest-flow class of blades, has more than double the B5 life of the Total Population. Class 3 has more than triple the B5 life of the Total Population. It is reasonable to conclude that the Class 2 results would fall between the Class 1 and Class 3 results. Similarly, Class 4 and 5 should have larger lives than Class 3. This example clearly demonstrates that selectively assembling turbine blade rows by flow class can significantly increase blade life.

Figure 11:
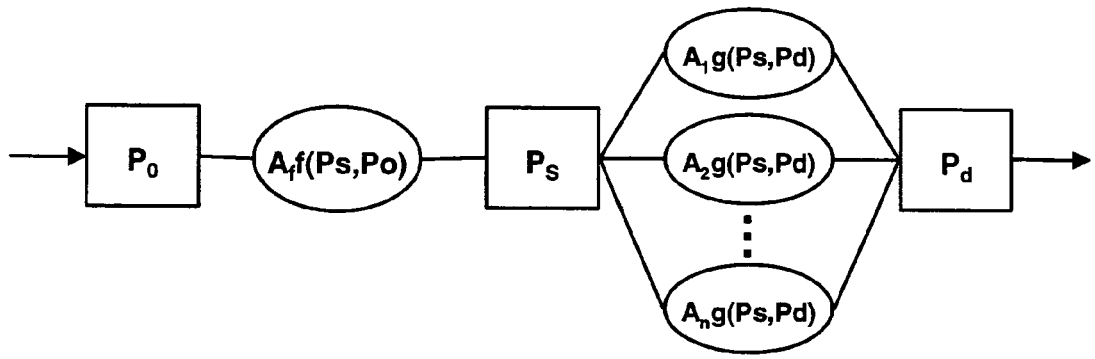
FIG. 11 is a flow network diagram for linearized analysis.

A simple linearized mathematical model can explain the effect seen in the example. Consider the flow network shown in FIG. 11. The governing equations for the system can be written as:

$$\dot{m} = A_f f(P_0, P_s)$$
$$\dot{m}_i = A_i g(P_s, P_d) \text{ for } i = 1, 2, \ldots, n$$
$$\dot{m} = \sum_{i=1}^{n} \dot{m}_i.$$

In this simplified model of a turbine disk with multiple cooled blades, the cooling air supply subsystem is represented by the effective area, $A_f$, and a mass flow-pressure relationship, $f(P_0, P_s)$. The n cooled blades are represented by an individual effective area, $A_i$, and a mass flow-pressure relationship, $g(P_s, P_d)$. The variability in mass flow capability will be modeled by differences in the individual blade effective areas.

For the situation in which all blades are assumed to be at their nominal effective areas ($A_i = A_g$ for all i), we define the nominal blade mass flow and the nominal supply pressure, $$\dot{m}_g \equiv \frac{1}{n}\dot{m}$$
$$P_{sg} \equiv P_s.$$

Next, consider independent perturbations to the blade effective areas:

$$A_i = \tilde{A}_i + A_g$$

The solution of the linearized governing equations gives the supply pressure perturbation (rearranged into non-dimensional form) as:

$$\tilde{P}_s \frac{A_g \frac{\partial g}{\partial P_s}}{\dot{m}_g} = -\frac{1}{1+\beta}\left(\frac{1}{n}\sum_{i=1}^{n}\frac{\tilde{A}_i}{A_g}\right)$$

where we introduce the non-dimensional parameter:

$$\beta = -\frac{A_f \frac{\partial f}{\partial P_s}}{nA_g \frac{\partial g}{\partial P_s}}.$$

Note that in general, $\partial f/\partial P_s \leq 0$ and $\partial g/\partial P_s \geq 0$, so $\beta \geq 0$. Also, many cooling air supply systems are relatively insensitive to downstream pressure changes, thus $\beta$ is often small.

The result for the supply pressure perturbation shows that the perturbation is governed by the average effective area perturbation in the disk:

$$\text{Average Effective Area Perturbation} = \left(\frac{1}{n}\sum_{i=1}^{n}\frac{\tilde{A}_i}{A_g}\right).$$

For rows with blades that have nominal flow capability, the supply pressure is the nominal supply pressure. However, if a row is assembled from blades that are on average low-flow blades (in this case the area perturbation is negative), the supply pressure will increase. This increased supply pressure then leads to an increase in the flow in an individual blade. Specifically, the mass flow perturbation in an individual blade (blade j, for example) is given by, $$\frac{\tilde{\dot{m}}_j}{\dot{m}_g} = \left(\frac{\tilde{A}_j}{A_g}\right) - \frac{1}{1+\beta}\left(\frac{1}{n}\sum_{i=1}^{n}\frac{\tilde{A}_i}{A_g}\right)$$

Thus, the mass flow perturbation through an individual blade is controlled by two effects: the effective area perturbation for the specific blade ($\tilde{A}_j/A_g$) and the average effective area perturbation. In the situation for which the average blade in the row is nominal (i.e. Average Effective Area Perturbation≈0), a low-flow blade will have reduced flow due to its own decreased effective area. In an entire airfoil row assembled from low-flow blades, a specific low-flow airfoil will experience less reduction in mass flow because of the negative average effective area perturbation (which results in an increased supply pressure). This effect will result in substantial improvements in the life of the turbine blades as shown in the previous example calculation. In particular, for common situations in which the supply system has low sensitivity to downstream pressure changes (and so $\beta$ is near zero), a low-flow blade assembled in a disk of low-flow blades will have nearly nominal mass flow.

Those skilled in the art will appreciate that selectively assembling turbine rows exclusively from blades or vanes in certain flow capability classes increases the flow through the lowest flowing airfoils in a turbine row. The methodology of the invention takes advantage of the fact that all the airfoils in a row share common source and dump pressures while each airfoil passes a different amount of flow consistent with its individual characteristic curve. The classes consist of subsets of the acceptable flow limits for turbine airfoils (high-flowing and low-flowing blades, as a simple example). Wherever the term "blade" is used herein it is to be understood to include other turbine components such as vanes and seals.

It is recognized that modifications and variations of the invention disclosed herein will occur to those skilled in the art and it is intended that all such modifications and variations be included within the scope of the appended claims.

The invention claimed is:

1. Method for assembling into sets gas turbine engine components having flow passages comprising classifying flow capability through the flow passages of each one of a plurality of the gas turbine engine components; and assembling into sets gas turbine engine components having the same flow capability classification.

2. The method of claim 1 herein the engine components are gas turbine engine turbine blades with internal cooling passages and holes for film-cooling.

3. The method of claim 1 herein the engine components are gas turbine engine turbine vanes with internal cooling passages and holes for film-cooling.

4. The method of claim 1 herein the engine components are gas turbine engine turbine seals.

5. The method of claim 1 wherein the engine components are blades in any stage of a turbine section of a gas turbine engine.

6. The method of claim 1 wherein the engine components are vanes in any stage of a turbine section of a gas turbine engine.

7. The method of claim 1 wherein the engine components are seals in any stage of a turbine section of a gas turbine engine.

8. The method of claim 1 wherein the turbine components are blades in any stage of a compressor section of a gas turbine engine.

9. The method of claim 1 wherein the turbine components are vanes in any stage of a compressor section of a gas turbine engine.

10. The method of claim 1 wherein the turbine components are seals in any stage of a compressor section of a gas turbine engine.

11. The method of claim 1 wherein the flow classification includes a high-flow capability class and a low-flow capability class.

12. The method of claim 1 wherein the flow classification includes more than two flow capability classes ranging from a low-flow capability class to a high-flow capability class.

13. The method of claim 1 wherein the flow classification includes flow capability classes that are subsets of acceptable flow limits for gas turbine engine components having internal flow passages.

14. The method of claim 1 wherein the flow classification produces sets of components with increased high-temperature oxidation life capability.

15. The method of claim 1 wherein the flow classification produces sets of components with increased high-temperature creep life capability.

16. The method of claim 1 wherein the flow classification produces sets of components with increased high-temperature life capability.

17. The method of claim 1 wherein required nominal amount of flow of the engine component can be reduced while maintaining high-temperature life capability.

18. The method of claim 1 wherein required nominal amount of flow of the engine component can be reduced while maintaining an intended nominal performance of the component.

19. The method of claim 1 wherein material of the engine component can be changed to a less capable material while maintaining an intended nominal performance of the component.

20. The method of claim 1 wherein turbine inlet temperature is increased while maintaining the intended nominal performance of the component.

* * * * *